Figure 1:
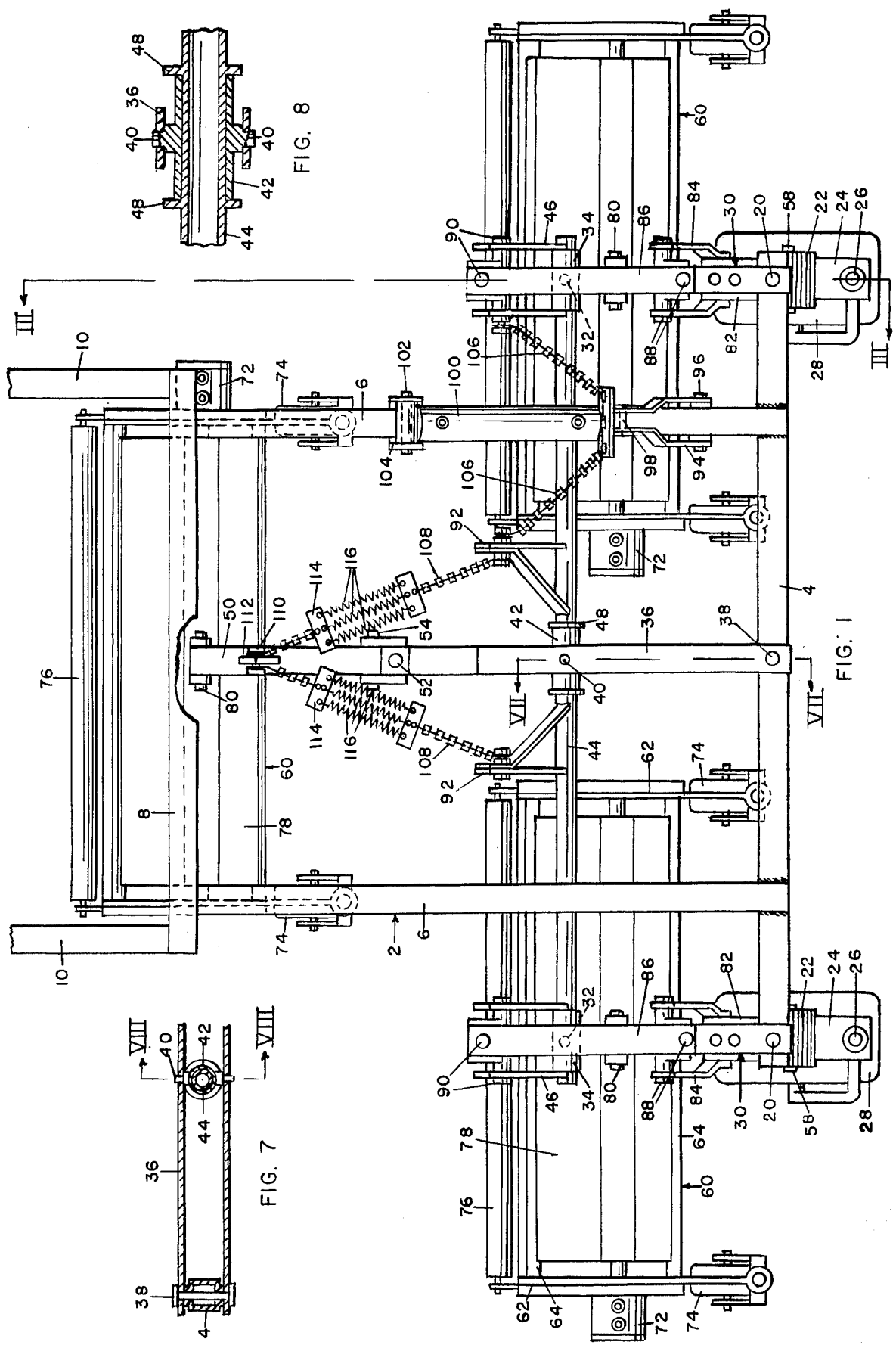

United States Patent [19]
Mullet et al.

[11] Patent Number: 4,478,026
[45] Date of Patent: Oct. 23, 1984

[54] GANG REEL MOWER

[75] Inventors: David L. Mullet, Hesston; Raymond J. Rilling, Moundridge; Elmer D. Voth, Newton, all of Kans.

[73] Assignee: Ekoeg Industries, Inc., Kans.

[21] Appl. No.: 500,880

[22] Filed: Jun. 3, 1983

[51] Int. Cl.³ ............................................. A01D 35/24
[52] U.S. Cl. .......................................... 56/7; 56/13.6; 56/15.2; 56/15.4
[58] Field of Search ...................... 56/6, 7, 13.6, 14.9, 56/15.2, 15.3, 15.4

[56] References Cited

U.S. PATENT DOCUMENTS

| | | | |
|---|---|---|---|
| 1,771,931 | 7/1930 | Kinney | 56/7 |
| 2,099,902 | 11/1937 | Moyer et al. | 56/7 |
| 2,139,200 | 12/1938 | Moyer | 56/7 |
| 2,259,553 | 10/1941 | Clapper | 56/7 |
| 2,725,703 | 12/1955 | Roseman, Jr. | 56/7 |

*Primary Examiner*—Robert P. Swiatek
*Assistant Examiner*—David I. Tarnoff
*Attorney, Agent, or Firm*—John A. Hamilton

[57] ABSTRACT

A gang reel mower consisting of a pair of mower heads of the ordinary reel type laterally spaced apart in a forward row, and another mower head disposed behind and laterally intermediate the mower heads in the forward row. Each mower head is castered about a vertical axis disposed forwardly thereof, in order that it may operate directly forwardly even when the mower as a whole is negotiating a turn, and the caster axis of the rear mower head is shifted laterally of the mower frame in order that it will always be aligned to cut the strip of grass left uncut by the front mower heads. Mechanism is provided for elevating the mower heads to a transport position well above ground level, and in so doing to cancel and lock any castering motion thereof.

6 Claims, 8 Drawing Figures

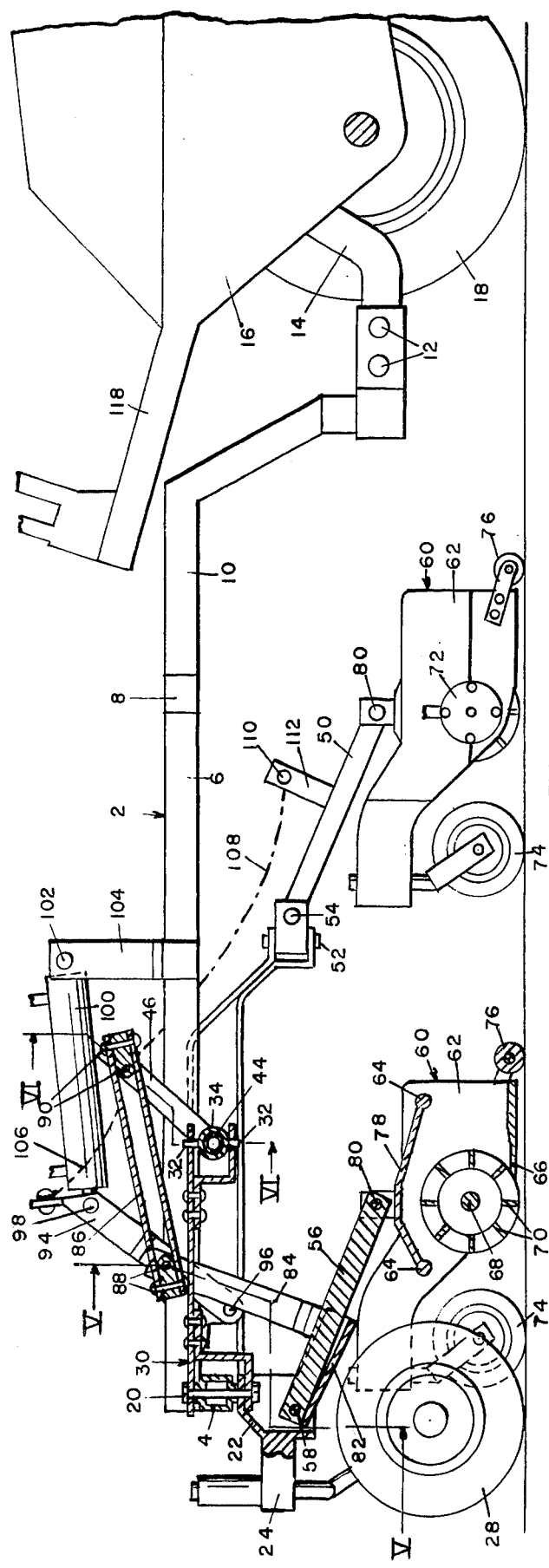

GANG REEL MOWER

This invention relates to new and useful improvements in mowing machines for lawns and the like, and has particular reference to a gang mower including a plurality of mower heads of the reel type.

Reel mowers, consisting of a series of helical blades arranged in skeleton cylindrical form and rotated tangentially to a fixed blade, are commonly believed to provide a smoother, more uniform cut than rotary mowers, and are therefore often preferred when particularly fine appearance is desired, such as on golf courses and the like. However, reel mowers must usually be rather short, in the direction of the reel axis, in order that they may follow lateral irregularities of ground contour accurately, so that they have not been well adapted for economical or convenient usage on large grass areas. Furthermore, mounting a plurality, or "gang", of reel mower heads in a single frame to increase the width of the swath to be cut, has not been practical. A reel mower head, to operate efficiently, must move straight forwardly, that is, with its reel axis and fixed blade normal to the direction of travel, and when more than one head is mounted in a single frame in laterally offset relation, and the frame as a whole must negotiate a curve, the respective mower heads move around arcs having different radii, and hence could not all move forwardly if they were fixed in said frame.

Accordingly, the primary object of the present invention is the provision of a gang reel mower including a plurality of reel mower heads mounted in a single frame, each head being castered about a vertical axis disposed forwardly thereof, whereby each mower head will trail accurately behind its caster axis, and hence move in a straight forward direction, regardless of the radius of the horizontal arc its caster axis may be called upon to follow when negotiating a curve.

As will be seen, the above described castering can produce a rather radical angling between each mower head and the general extent of the mower frame, particularly when negotiating a sharp curve. If the mower heads are arranged in forward and rearward rows, with each rear head disposed laterally intermediate the two adjacent heads of the forward row to cut the strip of grass left between the two forward heads, the described angling of the heads could cause the rear head to be laterally displaced relative to the forward heads, so that the strip of grass left uncut by the forward heads would not be properly cut by the rearward head. This would occur if the castering axes of all the heads were fixed relative to the frame. Accordingly, another object is the provision of a gang reel mower of the character described in which the mower heads are arranged forwardly and rearwardly of each other as discussed, but with the addition of means operable automatically to shift the caster axis of the rearward mower head laterally of the frame as may be required to cause the rearward head to bridge the lateral gap between the forward heads at all times.

It is also desirable that each mower head should be capable of being lifted well above ground level, to an inoperative transport position. However, if they are lifted and are also freely castered as thus far discussed, they would swing laterally out of control during transport, and damage could result. Accordingly, a still further object is the provision of a mower as described including mower head lifting means which, simultaneously, cancels castering of the heads, and locks them in a single position.

Other objects are simplicity and economy of construction, and efficiency and dependability of operation.

Figure 2:
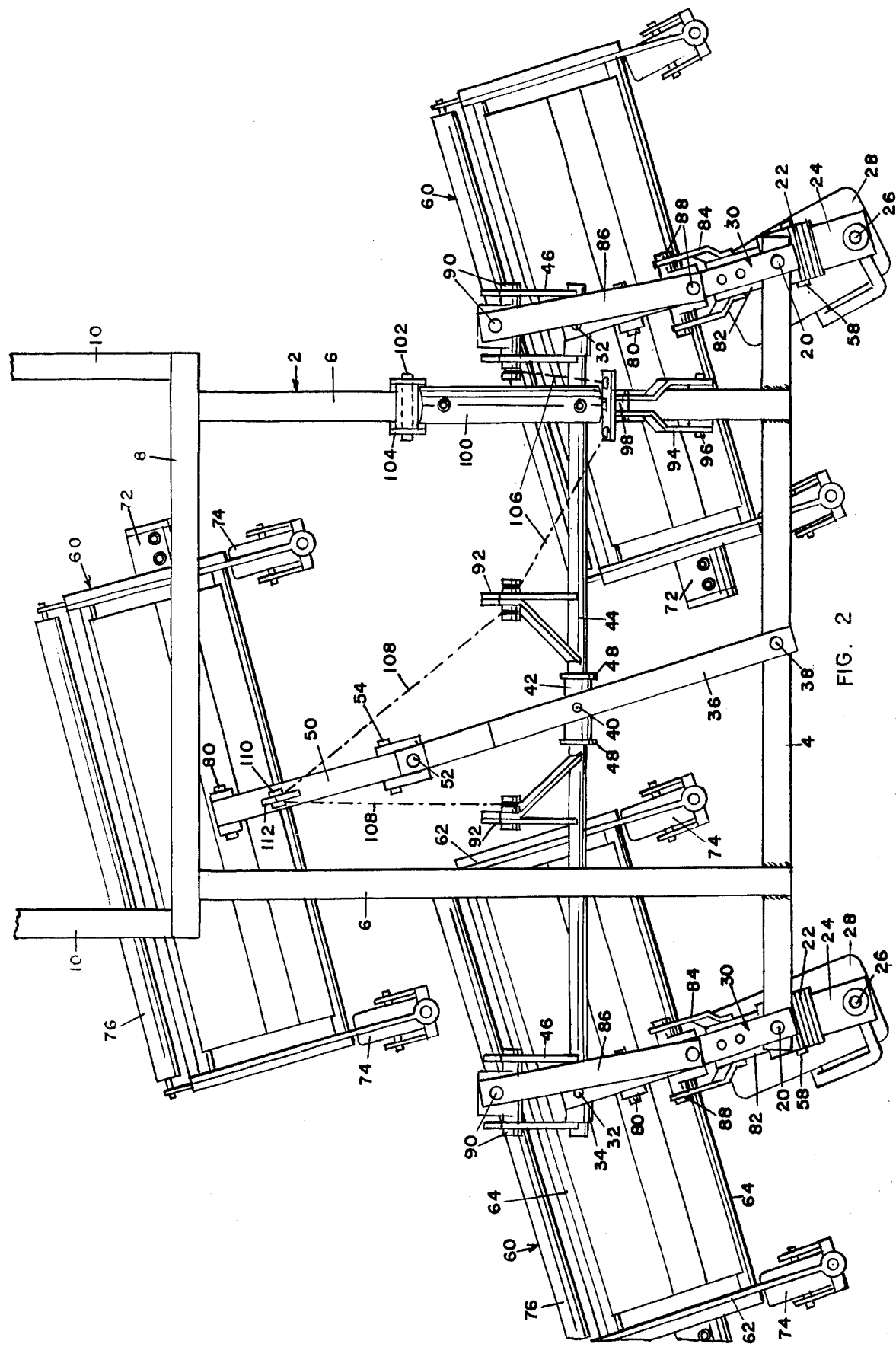

With these objects in view, as well as other objects which will appear in the course of the specification, reference will be had to the accompanying drawing, wherein:

FIG. 1 is a slightly fragmentary top plan view of a gang reel mower embodying the present invention, FIG. 2 is a view similar to FIG. 1, but showing the parts in the position assumed when the mower is negotiating a curve, FIG. 3 is a sectional view taken on line III—III of FIG. 1, FIG. 4 is a view similar to FIG. 3, but showing the parts in the position assumed when the mower heads are elevated to their transport positions, FIG. 5 is a fragmentary sectional view taken on line V—V of FIG. 3, FIG. 6 is a fragmentary sectional view taken on line VI—VI of FIG. 3, FIG. 7 is a fragmentary sectional view taken on line VII—VII of FIG. 1, and FIG. 8 is an enlarged, fragmentary sectional view taken on line VIII—VIII of FIG. 7.

Like reference numerals apply to similar parts throughout the several views, and the numeral 2 applies generally to the frame of the mower, said frame including a horizontal, transversely extending front bar 4, a pair of horizontal side bars 6 welded at their forward ends to front bar 4, in inwardly spaced relation from its respective ends, and extending rearwardly therefrom, a horizontal, transverse cross bar 8 affixed to the rearward ends of side bars 6, and a pair of more widely spaced side bars 10 affixed to the respective ends of cross bar 8, and extending rearwardly and then downwardly, all forming a unitary structure. The rearward end of each side bar 10 may be joined, as indicated at 12 in FIG. 3, to one of the pair of usual tool bars 14 of a small tractor 16, as is well known in the art. The tractor, shown fragmentarily, is used to propel the mower, itself being propelled by a pair of front wheels 18 (one shown) powered by the tractor engine.

Disposed beneath each extreme end portion of front frame bar 4, and pivotally mounted thereon by a vertical pivot pin 20, is a small, rigid pivot box 22. Said box is provided with a forward extension 24 in which is journalled a vertical shaft 26 forming the castering axis of a ground-engaging castered wheel 28 disposed therebeneath. The two wheels 28 support the forward end of frame 2. Also pivoted on each pin 20 is the forward end of a rearwardly extending horizontal crank arm 30. At its forward end, said crank is double, its upper member overlying front frame bar 4 and being engaged on pin 20, and its lower member projecting into pivot box 22 and engaged on pin 20, as shown in FIGS. 3 and 4, engaging snugly in said box so that the crank and pivot box always turn in unison. Each of the crank arms is also double at its rearward end, its upper and lower members being perforated to receive the upper and lower pintles 32 of a short, horizontally extending tubular sleeve 34, whereby said sleeve may pivot in a horizontal plane relative to the arm.

A longer carrier arm 36, also double, is pivoted at its forward end to the midpoint of front frame bar 4, midway between crank arms 30, by a vertical pivot pin 38, and extends rearwardly therefrom parallel to crank arms 30. At a point thereof corresponding to the length of cranks 30, its upper and lower members are perforated to receive the upper and lower vertical pintles 40 of a short horizontal tubular sleeve 42 similar to sleeves 34 of cranks 30. A horizontal, laterally extending connecting bar 44 extends the full distance between crank arms 30, projecting rotatably through both of sleeves 34 and also sleeve 42, extending beneath but not connected to frame side bars 6. A double crank arm 46 is affixed to said connecting bar at each of sleeves 34, and extends radially upwardly therefrom to a point well above arm 30. The side members of crank 46 bridge the associated sleeve 34 so as to severely limit any longitudinal sliding of the connecting bar in the sleeve. Flanges 48 fixed on bar 44 at respectively opposite ends of sleeve 42 prevent said bar from moving longitudinally in said sleeve. Thus both of crank arms 30, as well as arm 36, are connected to bar 44 for pivotal movement relative thereto on vertical axes, but bar 44 is left free for axial rotation. Arm 36 extends well to the rear of bar 44, and the rearward end portions of both the upper and lower members thereof are angled downwardly. A rearwardly and downwardly extending drawbar 50 is universally pivoted at its forward end to the extreme rearward end of arm 36, by right-angled pivots 52 and 54. Similarly, a drawbar 56 is pivoted at its forward end in each of pivot boxes 22 beneath front frame bar 4 on a horizontal transverse axis, as at 58, and projects normally rearwardly and downwardly. Drawbar 56 is always disposed directly beneath and in angular alignment with its corresponding crank arm 30.

A mower head 60 is mounted at the rearward end of each drawbar 56, and also at the rearward end of drawbar 50. Thus the heads carried by drawbars 56 are disposed in spaced apart relation in a lateral row beneath the forward portion of frame 2, and that carried by drawbar 50 is disposed behind the other two, laterally bridging the space between them. Of course, any desired number of mower heads could be used in both the forward and rearward rows, so long as they are related as described. The mower heads are of the reel type, many of which are commerically available, and no claim is made thereto in and of themselves. As shown, each mower head includes a pair of spaced apart vertical side plates 62 rigidly connected at their upper portions by transversely extending rods 64 and at their lower edges by a transversely extending straight blade member 66. A transverse horizontal reel shaft 68 extends between and is journalled in side plates 62, and carries a reel consisting of a series of helically curved blades 70 arranged in skeleton cylindrical form, whereby to cooperate with straight blade 66 to cut grass entering therebetween as the reel is rotated by a hydraulic motor 72 mounted on one of side plates 62. The mower head may be supported on the ground by a pair of castered ground-engaging wheels 74 mounted respectively on forward extensions of side plates 62, and by a ground-engaging roller 76 extending transversely between the rearward edges of the side plates, whereby to support blade 66 above the ground at the height it may be desired to cut the grass. This cutting height may be adjusted in most cases, but the adjusting means is not pertinent to the present invention and is not shown. The reel 70 is covered by a hood plate 78 affixed to rods 64, and the drawbar 50 or 56 of each mower head is pivoted to the top surface of said hood plate, as at 80, at least approximately over the center of gravity of the head.

The axis of pivot 80 is horizontal and disposed accurately normal to the normal straightforward direction of travel of the head required for most efficient operation, that is, parallel to reel shaft 68 and the cutting edge of blade 66.

The mower heads may be elevated above ground level to a transport position, and their castering action centered and locked, by means including a short rigid U-shaped support member 82 underlying and being capable of supporting the forward portion of each drawbar 56. The support member is pivoted in box 22 at 58 with the drawbar, but when the associated mower head is on the ground, is normally pivoted more sharply downwardly to the rear than the drawbar, whereby the drawbar may pivot freely to some degree without interference by the support member. Affixed to the rearward end of each support member 82 is a double crank 84, the members of which rise past the opposite sides of the associated crank arm 30, and extend thereabove. The upper end of crank 84 is universally pivoted to one end of a rigid link 86 by right-angled pivots 88, and the opposite end of said link is universally pivoted, as by right-angled pivots 90, to the upper movable end of the associated crank 46 of connector bar 44. Crank 84 is disposed forwardly from crank 46. Connecting bar 44 is also provided with a pair of additional cranks 92 rigidly affixed thereto in angular alignment with cranks 46, cranks 92 being spaced equidistantly at opposite sides of the central pivot 40 of arm 36, and disposed between side frame bars 6.

A double crank 94 is pivoted at its lower end, as at 96, to a bearing affixed beneath one of side frame bars 6, adjacent its forward end. The members of said crank rise at opposite sides of said frame bar, and extend well above it. At its upper end, said crank is pivoted, as at 98 to the forwardly extended end of the piston rod of a hydraulic cylinder 100, the opposite end of said cylinder being pivoted, as at 102, to a post 104 fixed to and rising from the same side frame bar. When the piston rod is extended, it pivots crank 74 forwardly, and when it is retracted, the crank is pivoted rearwardly.

The upper end of crank 94 serves as a driver member, and is connected, by a pair of flexible tension members 106, respectively to the upper end of the adjacent crank 46, and to the upper end of the adjacent crank 92. Similarly, a pair of flexible tension members 108, attached respectively to the upper ends of the two cranks 92, converge forwardly and are both secured at their forward ends, as at 110, to the upper end of a post 112 fixed to and rising from the drawbar 50 of the rear mower head 60. All of the tension members 106 and 108 are slack when the mower heads have been lowered to the ground, as indicated in FIG. 3. Futhermore, tension members 106 are selected in length to have equal amounts of slack when the drawbar 56 and crank arm 30 of the adjacent front mower deck extend rearwardly at right angles from the front frame bar, and tension members 108 are selected in length to have equal slack when the carrier arm 36 of the rear mower deck is disposed at right angles to connector bar 44. In FIGS. 2, 3 and 4, tension members 106 and 108 are indicated merely by broken lines, but in FIG. 1, members 106 are detailed as link chains, and members 108 are detailed also as link chains, but with each being interrupted by an insert 114 including a plurality of strong but elastically extensible tension springs 116. The purpose of these inserts will be described hereinbelow. Hydraulic motors 72, and cylinder 100, are powered by a complete and standard hydraulic system, not shown, but including a hydraulic pump mounted on and driven by tractor 16, as is common in the art, with fluid being delivered to and returned from the driven elements by hoses sufficiently long and flexible that they do not interfere with the described movements of the mower heads, and of cylinder 100, relative to frame 2.

In operation, it will be seen that when all of the mower heads 60 have been lowered to rest on the ground, as best shown in FIG. 3, and with the tension members 106 and 108 slack, and when the tractor is then driven forwardly by rotation of its drive wheels 48, each mower head has a freedom of movement permitting it to follow irregularities of ground contour accurately, in order to perform the smoothest, most attractive mowing job possible. They can rise and fall with the ground level independently of each other, due to the veritcal pivotability of the end connections of their drawbars 50 or 56. They can each rock longitudinally of the path of travel, due to their pivotal connections 80 to their drawbars. They can rock laterally to the line of travel due to looseness intentionally provided in the end connections of the drawbars. Furthermore, each head always moves in a straight forward direction, that is, normally to their reels 70 and blades 66, which is required for most efficient operation, due to the castered mounting of the mower heads, the front heads each having a castering axis at 20, and the rear head at 52. Even the two forward heads, which would appear to be locked into precisely equal castering by connecting bar 44, which joins their crank arms 30, may as a practical matter, caster independently of each other to any required degree, due to almost unavoidable looseness in the end connections of bar 44. The difference of castering angles required for the two front mower heads to keep each moving straight forwardly is at most very slight, and construction of the device with sufficient accuracy and rigidity to preclude this variation would be quite impractical. However, if desired, additional looseness could be intentionally introduced, for example by shortening the end pivot sleeves 34 of bar 44 to permit some end play thereof along said bar, as indicated in FIG. 6.

When tractor 16 is steered to negotiate a turn, the mower parts assume the positions shown in FIG. 2, the mower heads 60 castering to an angle depending on the direction and sharpness of the turn. FIG. 2 shows the mower negotiating a rather sharp left turn. The front mower heads, moved sharply to the right by their ground contact, also force connecting bar 44 to the right, thus pivoting carrier arm 36, which carries the rear mower head, to an angle substantially equal to the castering angle of the front mower heads. This moves the castering axis 52 of the rear mower head to the right, so that said rear mower head, which as shown in FIG. 1 is arranged to bridge the lateral gap between the front heads to cut the uncut strip of grass left between the front heads, is maintained in the same relation to the front heads despite the angulation of said front heads in even the sharpest turns which can be negotiated. Tension members 106 and 108 are of such length as to remain slack even in the sharpest turn possible. The universal pivots 88 and 90 at the ends of each link 86 permit the misalignment of the related cranks 46 and 84 which occurs when connecting rod 44 is moved longitudinally.

When it is desired to elevate the mower heads above ground level to a position for easy transport when actual operation thereof is not desired, the piston rod of hydraulic cylinder 100 is extended forwardly by control means actuated by the tractor operator, as indicated in FIG. 4. This pivots crank 94 forwardly, and this crank, operating through tension members 106 and the cranks 46 and 92 of connecting bar 44 to which they are attached, pivots all of cranks 46 and 92 forwardly, by turning bar 44 in sleeves 34 and 42. Each crank 46, operating through its associated rigid link 86, pivots the crank 84 of the associated front mower head forwardly. After this movement has taken up the lost motion of the support member 82 to which crank 84 is affixed, said support member engages and pivots the associated mower drawbar 56 upwardly, lifting the mower head 60 carried thereby upwardly from the ground, as indicated. The lost motion between each support member and its drawbar 56 permits the mower head to rise and fall slightly, to follow irregular ground contours, without requiring it to operate crank 84, link 86 and crank 46. Similarly, the forward motion of cranks 92, acting through tension members 108, elevates rear mower head 60 from the ground, also as indicated in FIG. 4, but in this case there is no need for the lost motion connection used with the front mower heads.

If, as in FIG. 2, the mower heads are castered to one side or the other when cylinder 100 is extended to elevate them, it will be apparent that the tension member 106 having the longer distance to span (i.e. the one connected to a crank 92 as shown) will become taut first, while the other remains slack. Elevation of the mower heads will then begin under the pull of the taut tension member, but as the mower head begins to rise, the tension of the taut tension member will pull connecting bar 44 toward a central position (i.e. to the right as shown) in which the drawbars 56 of the front heads extend directly rearwardly, as will also the carrier arms 36 of the rear head. At this central position, both tension members 106 become taut, and drawbars 56 are locked against any castering motion, since connecting bar 44 is locked against longitudinal movement. Similarly, tension members 108 bring drawbar 50 of the rear mower head to a central position extending rearwardly from its caster axis 52, and lock it in that position. Without this centering and locking of the castering motion of the mower heads, they could swing from side to side when elevated for transport, forcibly and without control, and damage to critical parts could result.

The springs 116 of tension members 108 are of sufficient strength that they are not appreciably extended by the weight of rear mower head 60 as it is elevated. Actually, they function as safety devices. Portions of tractor 16, in this case specifically the footboard 118 used by the tractor operator, extend well forwardly of the front wheels 18 of the tractor. If the tractor enters a sharp declivity, for example as when transversing a ditch, footboard 118 will drop sharply, passing between rear side frame bars 10, which are widely spaced apart to prevent interference with the footboard, and sharply engage rear mower head 60, if that head has been elevated to its transport position. Under these circumstances, springs 116 will yield to prevent damage.

While we have shown and described a specific embodiment of our invention, it will be readily apparent that many minor changes of structure and operation could be made without departing from the spirit of the invention.

What we claim as new and desire to protect by Letters Patent is:

1. A gang reel mower comprising:
   a. a generally horizontal frame having means for supporting it for movement over the ground in spaced relation thereabove,
   b. a plurality of reel-type mower heads disposed in horizontally spaced apart relation beneath said frame, so as to be supported on the ground and to cut grass when moved forwardly thereover,
   c. castering means connecting each of said mower heads to said frame for pivotal motion about a vertical axis disposed forwardly of said head, whereby each head moves accurately forwardly even when the mower is negotiating a turn,
   d. means operable to drive said mower heads, and
   e. power means operable when actuated to elevate said mower heads relative to said frame to a transport position out of contact with and well above ground level, said power means including means whereby it is rendered additionally operable, as it elevates each of said mower heads, to move said mower head to a central portion of its castering motion, and to substantially lock it against further castering motion.

2. A gang reel mower comprising:
   a. a generally horizontal frame having means for supporting it for movement over the ground in spaced relation thereabove, and adapted to be affixed to a tractor in forwardly extending relation to said tractor,
   b. a plurality of reel-type mower heads disposed in horizontally spaced apart relation beneath said frame, so as to be supported on the ground and to cut grass when moved forwardly thereover, said mower heads being divided into forward and rearward sets, the forward set including two laterally spaced apart heads and the rearward set including one head disposed behind but laterally bridging the gap between the forward heads,
   c. castering means connecting each of said mower heads to said frame for pivotal motion about a vertical axis disposed forwardly of said head, said castering means for each of said mower heads comprising a drawbar associated at its forward end with said frame for universal pivotal movement relative to said frame, and connected at its rearward end to said mower head for pivotal movement on a horizontal transverse axis,
   d. a horizontal crank pivoted at its forward end to said frame coaxially with the castering axis of the drawbar of each of said forward mower heads, being disposed above and constrained to move in angular unison with said drawbar, said cranks extending generally rearwardly,
   e. a transverse horizontal connecting bar extending between and pivoted to the rearward end of each of said cranks on a vertical axis, said connecting bar being axially rotatable about its pivotal connections to said cranks,
   f. a carrier arm pivoted at its forward end to said frame on a vertical axis midway between the pivotal axis of said cranks, and pivoted on a vertical axis to said connecting bar midway between the connections of said bar to said cranks, said connecting bar also being axially rotatable about its pivotal connection to said carrier arm, said carrier arm extending well to the rear of said connecting bar and the drawbar of said rear mower head being universally pivoted to the rearward end thereof,
   g. power means operable to pivot said connecting bar about its axis,
   h. actuating means operable by said pivoting of said connecting bar to pivot each of said drawbars to elevate said mower heads above ground level, and
   i. means operable to drive said mower heads.

3. A mower as recited in claim 2 wherein said actuating means, with respect to each of said front mower heads, comprises:
   a. a crank affixed radially to said connecting bar, and
   b. a linkage between the free end of said connecting bar crank and the drawbar of said front mower head.

4. A mower as recited in claim 3 wherein there is a lost motion connection between said linkage and said drawbar, whereby said drawbar may normally freely pivot vertically to a limited degree.

5. A mower as recited in claim 2 wherein said actuating means, with respect to said rear mower head, comprises:
   a. a first pair of radially extending cranks affixed to said connecting bar, respectively at laterally opposite sides of said carrier arm, and
   b. a first pair of flexible tension members attached respectively at their forward ends to said first cranks and at their rearward ends to the drawbar of said rear mower head, and being selected in length to remain slack so long as said rear head rests on the ground, but to first tighten and then lift said head as said connecting bar is pivoted.

6. A mower as recited in claim 5 wherein said first pair of tension members are selected in length to have equal amounts of slack when said rear mower head is on the ground, when the rear head is castered, directly rearwardly, and when said carrier arm also extends directly rearwardly, and wherein said power means for pivoting said connector bar comprises:
   a. a driver member carried by said frame for powered movement in a plane substantially normal to said connecting bar,
   b. a second pair of radially extending cranks affixed to said connecting bar, respectively at opposite sides of the plane of movement of said driver member, and
   c. a second pair of flexible tension members each attached at one end to said driver member, and respectively at their opposite ends to the outer ends of said second cranks, said second tension members being selected in length to remain slack at all castering positions of said front mower heads, and to have equal amounts of slack when said connecting bar is disposed at the midpoint of its longitudinal movement which occurs during castering of the forward heads, but to first tighten and then turn said second cranks as said driver member is moved in one direction.

* * * * *